(12) United States Patent
Michiels

(10) Patent No.: US 12,251,861 B2
(45) Date of Patent: Mar. 18, 2025

(54) BARRIERS FOR PLASTIC PREFORMS AND CONTAINERS AND PREFORMS AND CONTAINERS MADE THEREWITH

(71) Applicant: Plastipak Belgium BVBA, Brecht (BE)

(72) Inventor: Youri Michiels, Antwerp (BE)

(73) Assignee: Plastipak Belgium BVBA, Brecht (BE)

( * ) Notice: Subject to any disclaimer, the term of this patent is extended or adjusted under 35 U.S.C. 154(b) by 578 days.

(21) Appl. No.: 17/432,649

(22) PCT Filed: Feb. 21, 2020

(86) PCT No.: PCT/IB2020/051477
§ 371 (c)(1),
(2) Date: Aug. 20, 2021

(87) PCT Pub. No.: WO2020/170209
PCT Pub. Date: Aug. 27, 2020

(65) Prior Publication Data
US 2022/0161470 A1 May 26, 2022

Related U.S. Application Data

(60) Provisional application No. 62/809,095, filed on Feb. 22, 2019, provisional application No. 62/809,114, filed on Feb. 22, 2019.

(51) Int. Cl.
*B29C 45/14* (2006.01)
*B29B 11/08* (2006.01)
(Continued)

(52) U.S. Cl.
CPC .............. *B29C 45/14* (2013.01); *B29B 11/08* (2013.01); *B29C 45/0001* (2013.01);
(Continued)

(58) Field of Classification Search
CPC ...... B29C 45/14; B29C 45/0001; B29B 11/08
See application file for complete search history.

(56) References Cited

U.S. PATENT DOCUMENTS 5,114,688 A * 5/1992 Martell ................ C07D 259/00
556/110
7,186,464 B2 3/2007 Laplante et al.
(Continued)

FOREIGN PATENT DOCUMENTS

EP 1893679 A1 3/2008
EP 1893679 B1 3/2008
(Continued)

OTHER PUBLICATIONS

English machine translation for JP4945755B2. (Year: 2005).*
(Continued)

*Primary Examiner* — Michael C Miggins
(74) *Attorney, Agent, or Firm* — Fishman Stewart PLLC

(57) ABSTRACT

A barrier for injection molding, the barrier including a manganese (Mn) catalyst and an oxygen barrier. In embodiments, the oxygen barrier comprises MXD6. Such barriers may be included with a polymer to form a composition used in an injection process. In other embodiments, a barrier includes a transition metal catalyst, an organic compound, and a radical initiator. In embodiments, the radical initiator comprises one or more azo-compounds or peroxides. Plastic preforms and containers that are injection molded with such barriers/compositions are also disclosed.

21 Claims, 10 Drawing Sheets

(51) Int. Cl.
- *B29C 45/00* (2006.01)
- *B29K 67/00* (2006.01)
- *B29K 77/00* (2006.01)
- *B29K 103/06* (2006.01)
- *B29L 31/00* (2006.01)

(52) U.S. Cl.
CPC .... *B29K 2067/003* (2013.01); *B29K 2077/00* (2013.01); *B29K 2103/06* (2013.01); *B29L 2031/712* (2013.01)

(56) References Cited

U.S. PATENT DOCUMENTS

| | | |
|---|---|---|
| 2002/0037377 A1 | 3/2002 | Schmidt et al. |
| 2003/0151025 A1 | 8/2003 | Yang et al. |
| 2005/0181156 A1 | 8/2005 | Schmidt et al. |

FOREIGN PATENT DOCUMENTS

| | | |
|---|---|---|
| WO | 06/125823 A1 | 11/2006 |
| WO | 13/028290 A1 | 2/2013 |

OTHER PUBLICATIONS

European Office Action, 20709728.8, dated Aug. 26, 2022.
International Search Report, PCT/IB2020/051477, dated May 13, 2020.

\* cited by examiner

BARRIERS FOR PLASTIC PREFORMS AND CONTAINERS AND PREFORMS AND CONTAINERS MADE THEREWITH

CROSS-REFERENCE TO RELATED APPLICATIONS

This application is a National Stage Patent Application of International Patent Application PCT/IB2020/051477, filed Feb. 21, 2020, which claims priority to U.S. Provisional Application No. 62/809,095, filed Feb. 22, 2019, and 62/809,114, filed Feb. 22, 2019, the entire disclosures of which are incorporated herein by reference.

TECHNICAL FIELD

The present disclosure generally relates to barriers or barrier materials for plastic preforms and containers, and plastic preforms and containers that include barriers or barrier materials.

BACKGROUND

Plastic containers are used to hold a variety of contents. Plastic preforms and containers may be comprised of various polymers and may have varying degrees of permeability to oxygen or other molecules. It can be desirable to provide plastic preforms and containers that have barrier properties that may reduce or eliminate certain permeation or levels of permeation. Such barrier compounds/materials may affect or improve, among other things, a molecular permeation associated with a preform or container.

SUMMARY

The present disclosure includes a barrier for injection molding. In embodiments, the barrier including a manganese (Mn) catalyst and an oxygen barrier. In some embodiments, the oxygen barrier comprises MXD6. Such barriers may be included with a polymer to form a composition used in an injection process—for example, PET injection molding. In other embodiments of the disclosure, a barrier may include a transition metal catalyst, an organic compound, and a radical initiator. In embodiments, the radical initiator may comprise azo-compounds or peroxides. Plastic preforms and containers that are injection molded with such barriers/compositions are also disclosed.

The foregoing and other aspects, features, details, utilities, and/or advantages of embodiments of the present disclosure will be apparent from reading the following description, and from reviewing the accompanying drawings.

DETAILED DESCRIPTION

Figures 10A, 10B:
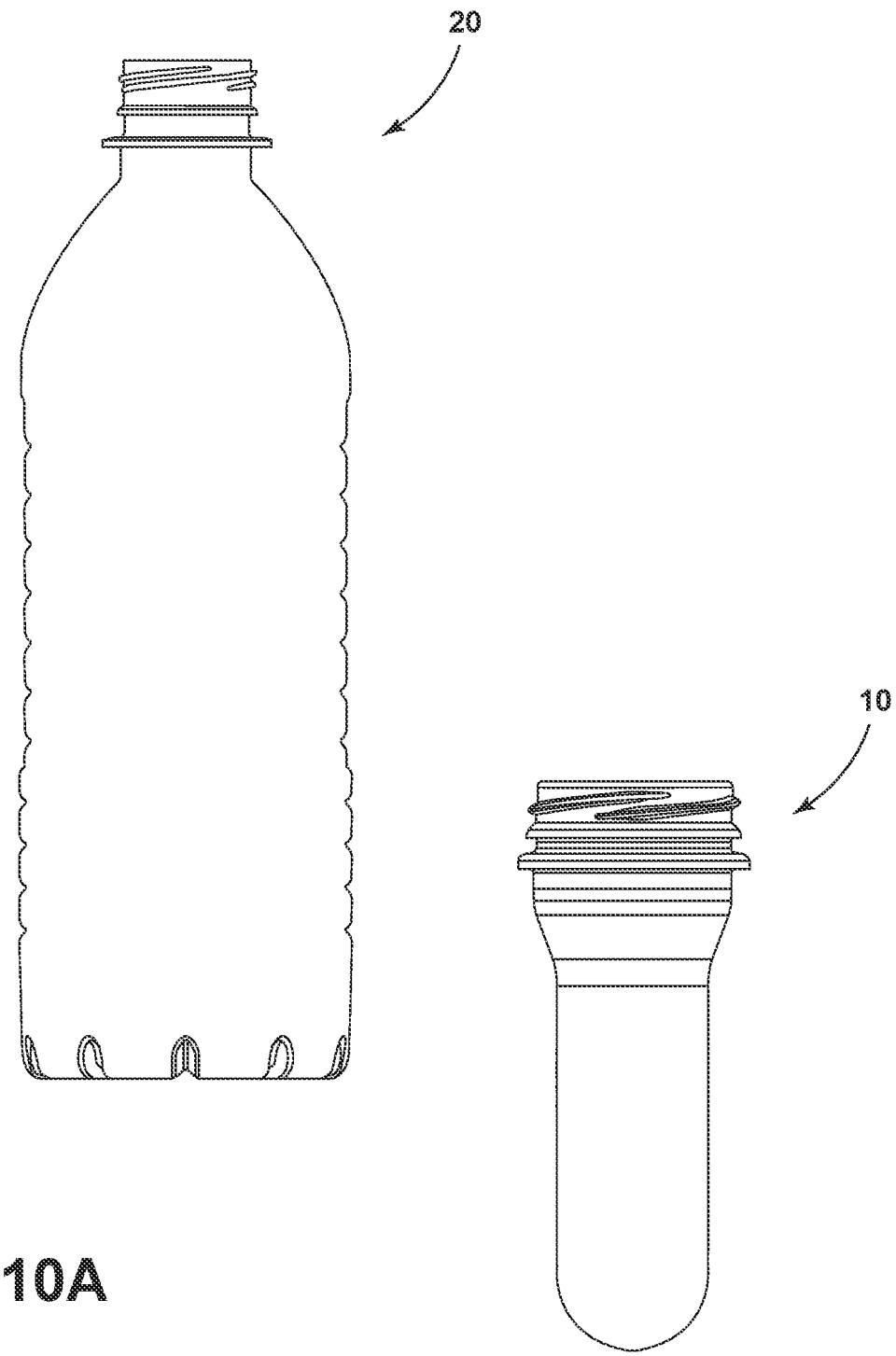
FIGS. 10A and 10B generally illustrate an embodiment of a plastic preform and plastic container.

This disclosure involves barriers (or barrier compositions) for plastic preforms and/or plastic containers, including plastic preforms or containers that may be comprised of plastic or a polymer (such as, without limitation, polyethylene terephthalate (PET), polypropylene (PP), and polyethylene (PE)), as well as containers that may be formed via an injection molding process. For example and without limitation, a plastic preform 10 and plastic container 20 are generally illustrated in FIGS. 10A and 10B.

An aspect of this disclosure involves, among other things, manganese (Mn) catalysts that may be used in connection with oxygen barriers (or barrier compositions) associated with plastic preforms and containers.

Cobalt can be used in connection with various active oxygen barriers (oxygen scavengers) and has been known to work under the principle of catalysis (e.g., Fenton catalysis). The Fenton oxidation cycle is based on a radicalar mechanism, and has been applied in bleaches, paints, glues, and water purification, as well as oxygen barriers. Known catalysts for this type of reaction include iron (as the main catalyst), manganese, cobalt, copper, nickel and zinc. In some instances, heavier metals are also included in the list (e.g., ruthenium, cerium, etc.).

With a number of known oxygen scavengers, all of the foregoing metals may be used as catalysts. The ability to replace one metal for the other is often available for room temperature applications. However, when attempting to replace cobalt as a preferential metal for oxygen barriers, it is commonly not possible and/or may lead to failure.

Existing oxygen barriers typically do not involve PET using or including manganese. One noted exception did not include nylon MXD6 as a sacrificial polymer (i.e., only as a carrier). However, a highly active, unsaturated compound was required to be added and, even then, the Mn salt did not reach the activity of cobalt.

The foregoing is associated with the electron distribution in the d-orbitals with such metals. The d-nature of cobalt (II) makes it the only one of the Fenton catalysts to be most prevalent as a tetrahedral complex in its $^4A_2$ electron configuration. A sufficient stability of this complex may be found at temperatures commonly associated with PET-injection. However, octahedral complexes of other metal ions attributed to Fenton-catalysis are much less efficient in a PET-carrier due to oxidation during processing. Non-ionic ligands, such as water, are commonly coordinated with these metals to provide its octahedral structure. Although, at high temperatures and especially in an oxidative environment, such are likely to be exchanged with reactive oxygen species. These are specifically generated when a sacrificial polymer is present that has a specific affinity for oxidation. Complexation between reactive oxygen species and metal ions will form crystalline hydroxide and oxide structures that are unable to perform Fenton-catalysis. The mechanism can even be observed at low temperatures as a differentiation in activity between metal ions. As such, cobalt was previously conventionally thought to be the only catalyst successful for a PET-based oxygen scavenger.

In general, in the field and in practice, it was previously thought that Fenton-catalysis revolves around the metal ions being able to move around freely to interact with the radicals and organic compounds within the medium. However, as disclosed in connection with embodiments of the disclosure, that is not necessarily the case for a polymer matrix. Applicant discovered, inter alia, that mobility of the metals may not be required in the presence of water. In embodiments of the disclosure, manganese or iron may essentially be forced to stay apart from each other, even at higher temperatures. In the absence or reduction of mobility, the complexation of these metal ions to crystalline hydroxide or oxide structures can be mitigated or annulled. Additionally, restrictions on the ligation sites caused by rigid structures may force certain metal ions into a preferred tetrahedral coordination.

In embodiments, a polynuclear complex may be created with manganese ions. The ions may be physically separated, for example by organic bifunctional ligands, to provide a barrier between them. In an embodiment, something rigid, such as terephthalic acid, may be used. However, without limitation, other polyacids or polyamines may instead or also be utilized. Additionally, using just this as ligand can lead to metal-organic frameworks (MOF's), which are crystal-type particles of which only the surface may be active as a Fenton-catalyst. Moreover, with embodiments, a ligand with a single ligation site, e.g. a monoacid, monoamine, or specific diamines, may be added to disrupt the crystalline structure and form a so-called coordination polymer. This type of Fenton-catalyst was not previously found with plastic (e.g., PET) injection molding applications.

Several Co- and Mn-based coordination polymers may be created and may be extremely active as Fenton-catalysts. Moreover, the metal ions in these coordination polymers can be either of an octahedral or tetrahedral nature, depending on the ligand types. Such coordination polymers may, for example and without limitation, even successfully surpass cobalt as an oxygen scavenger catalyst in a monolayer PET-container (or bottle), such as in combination with nylon MXD6.

By way of example and without limitation, an example of a developed method/composition proceeded as follows: 1.45 g of cobalt nitrate was dissolved in 100 ml of water (0.050 M cobalt) in a round-bottom flask. In a separate container, 1.25 g of terephthalic acid was added to 100 ml of water. The pH was neutralized by adding a 0.1M NaOH solution. By raising the pH, terephthalic acid started to dissolve and when a clear liquid was obtained, it was added to the cobalt solution and this was refluxed overnight. After this period, the red liquid regained its transparency while pink solids appeared, indicating the occurrence of ligation between terephthalic acid and cobalt. 2.84 g of stearic acid was then added. The stearic acid formed an emulsion in the water that attracted the pink cobalt terephthalate particles. After six more hours of reflux, the solution was cooled down and filtered. The solids were dried overnight (e.g., at 60° C.), which shifted the color from pink to a bluish purple. The obtained powder was dispersed in acetone through ultra-sonification, releasing excess stearic acid from the structure. After sedimentation of the complexes, the supernatant containing stearic acid was removed. This step was repeated a number of times (e.g., five times in one embodiment).

The synthesized complexes can be characterized to show the structure of a coordination polymer has been introduced at least to some degree. Powder X-Ray Diffraction (XRD) may be performed, for example, in transmission mode on a STOE Stadi P instrument with CuKα radiation.

Figure 1:
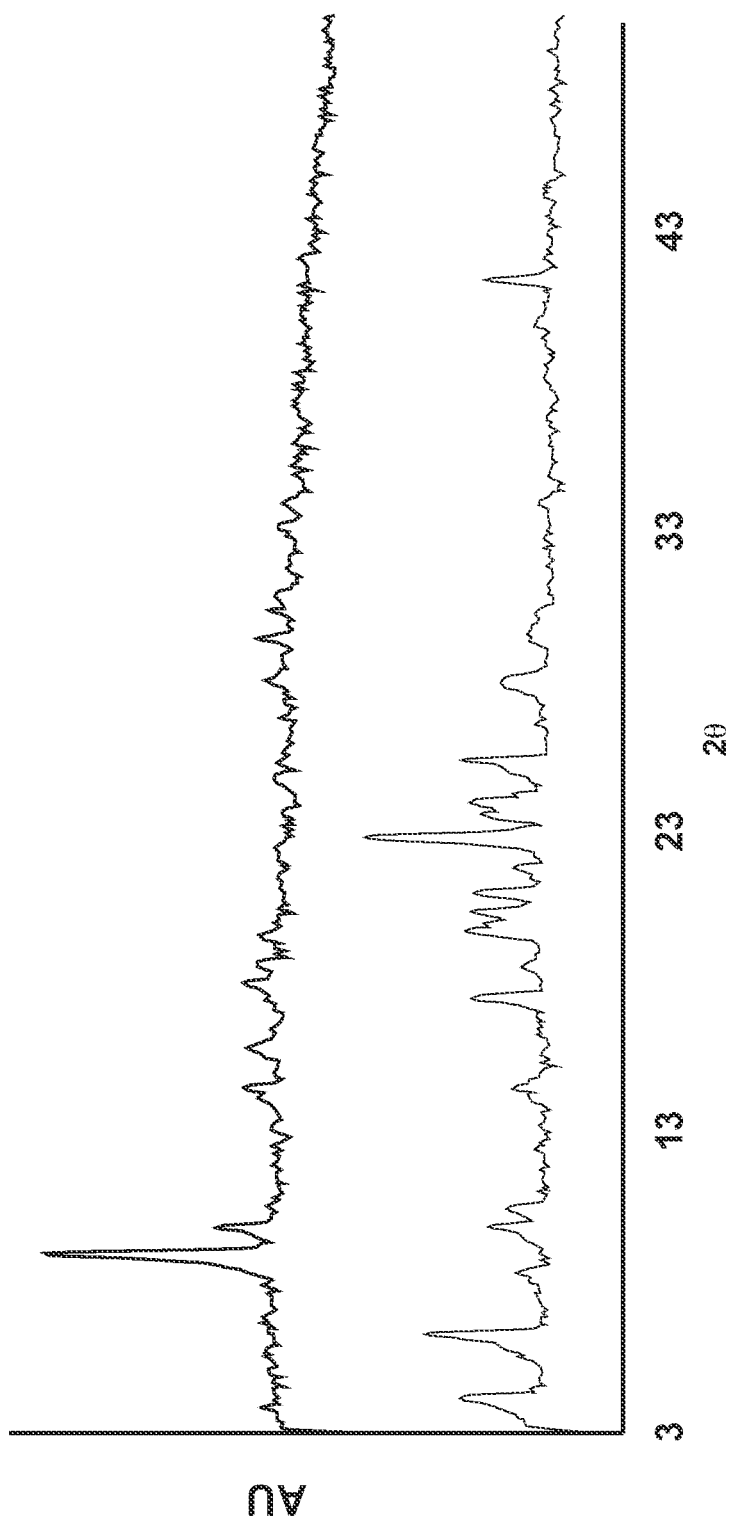
FIG. 1 shows a graph according to aspects of the disclosure that depicts XRD powder diffractograms with terephthalic acid, before and after an extra addition of stearic acid as the monoacid.

FIG. 1 shows a graph according to aspects of the disclosure that depicts XRD powder diffractograms with terephthalic acid, before (darker/upper plot) and after (lighter/lower plot) an extra addition of stearic acid as the monoacid. For example and without limitation, in FIG. 1, the diffractogram of the cobalt complex after a ligand exchange with only terephthalic acid showed a well-defined crystalline character with the most intense peak at about d=9.0 Å, which is conform terephthalate complexes in literature. After the addition of stearic acid, the diffractogram showed a much more diverse diffraction pattern. This may be at least partially attributed to an amorphous arrangement, which would be present due to the collapse of the crystalline terephthalate complexes.

Figure 2:
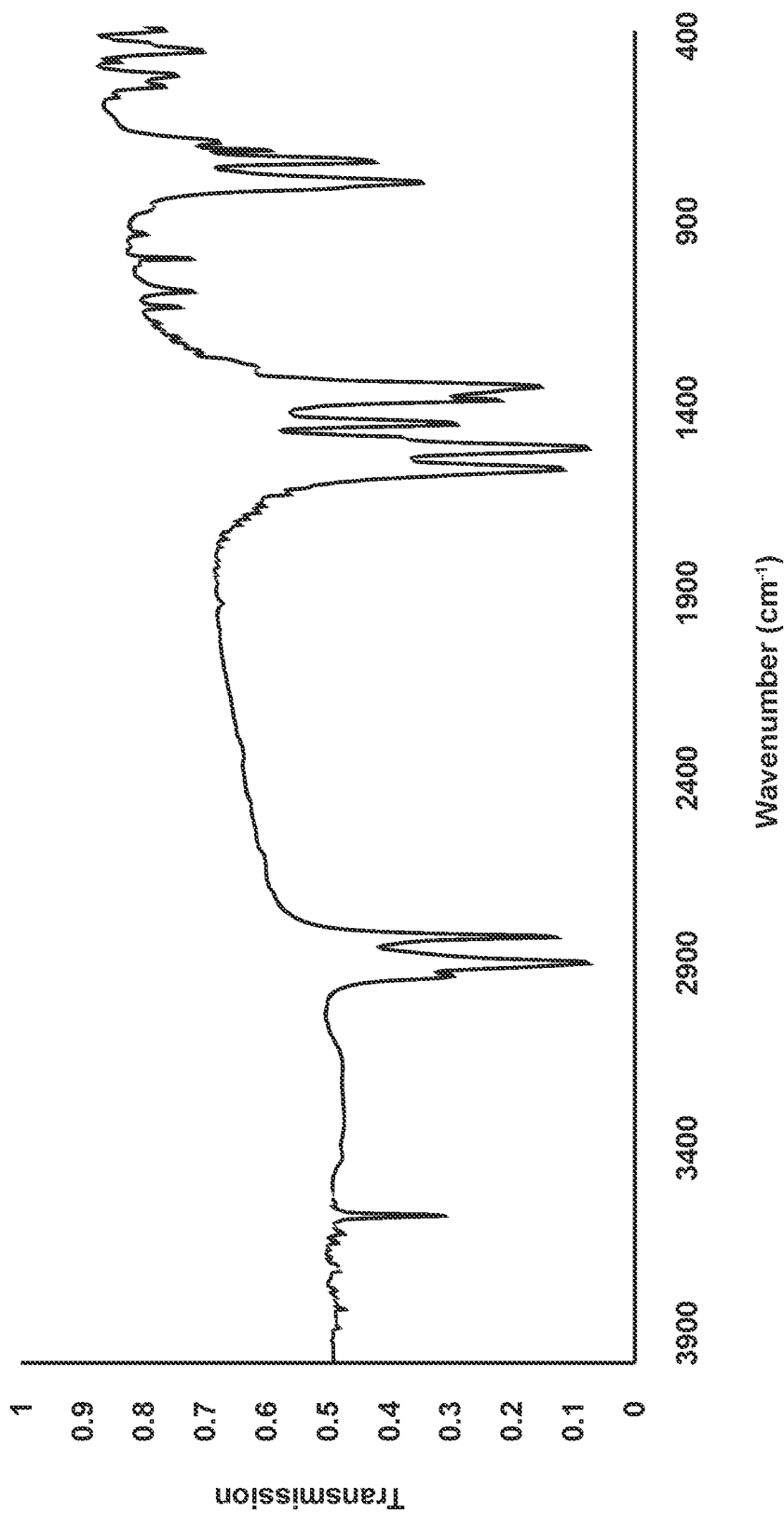
FIG. 2 shows a graph according to aspects of the disclosure that depicts a FTIR spectrum of a synthesized cobalt complex.

Fourier transformed infrared spectroscopy may be detected, for example, on a Bruker IFS 66 v/S spectrometer in transmission and under vacuum. In an embodiment, a 1% dilution of the metal salt in KBr can be prepared and compressed to a plaque. The background spectrum of pure KBr can be subtracted from the sample. An example of an achieved spectrum is generally illustrated in FIG. 2—which includes a graph that generally depicts a FTIR spectrum of a synthesized cobalt complex.

By way of reference, the typical C=O stretches (around 1685 $cm^{-1}$) that are typical for non-ligated carboxylic acids cannot be found, but the presence of complexed stearate and terephthalate can be recognized by the absorption at about 2920 $cm^{-1}$ and about 2850 $cm^{-1}$ (C—H stretch of stearic acid), about 1524 $cm^{-1}$ (CC—H bend+C=C stretch combination of terephthalic acid) and about 810 $cm^{-1}$ (ring breathing of terephthalic acid). Also, O=C—O$^-$-stretches at about 1583 $cm^{-1}$ (asymmetrical) and about 1361 $cm^{-1}$ (symmetrical) may be found, which can demonstrate the coordination of the acids to the cobalt ions. With the demonstration of coordination at each of the terephthalate carboxylate groups, it can be demonstrated that a coordination polymer-type complex is formed.

Figure 3:
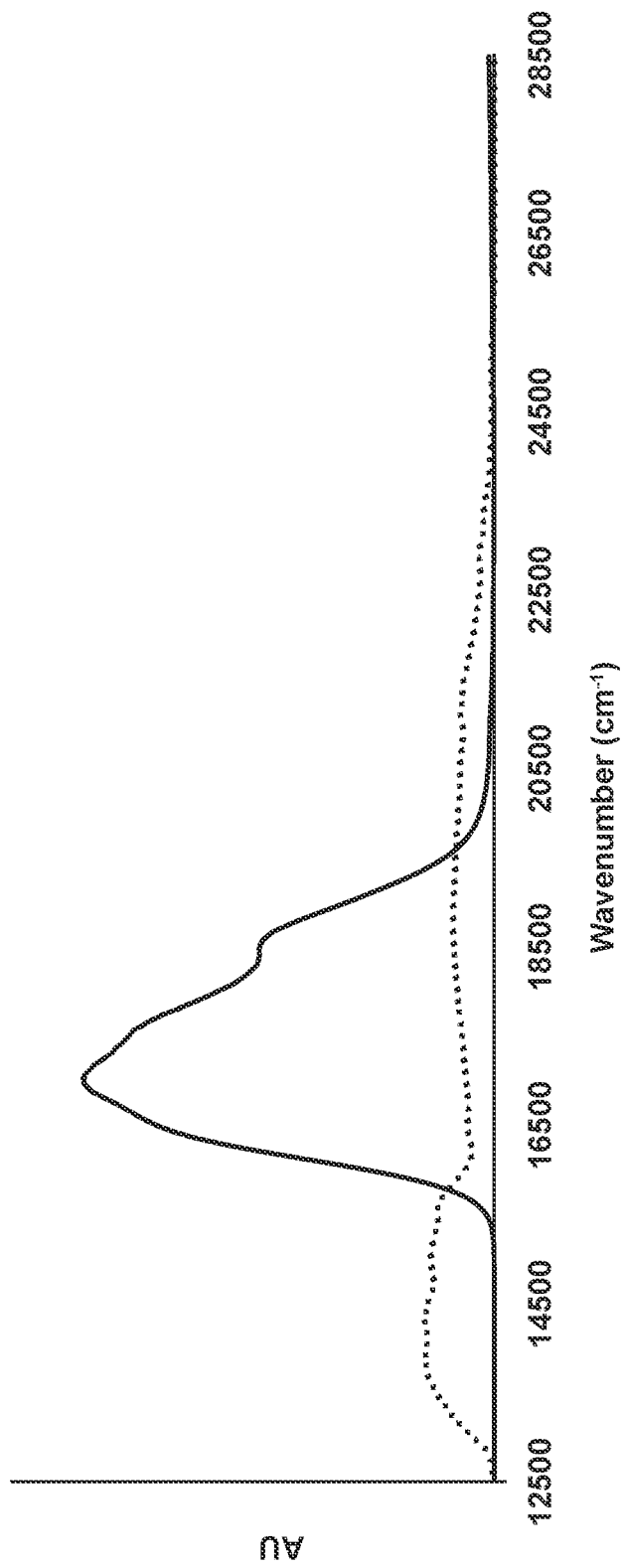
FIG. 3 shows a graph according to aspects of the disclosure that depicts an electronic spectra of a synthesized cobalt catalyst and cobalt nitrate.

FIG. 3 generally illustrates the electronic spectra of the complexes—i.e., an electronic spectra of a synthesized cobalt catalyst (solid line) and cobalt nitrate (dotted line).

Diffuse reflectance spectroscopy may, for example, be performed at room temperature on a Varian Cary 5000 apparatus from Agilent against a halon white reflectance standard. The samples may, for example, be sieved to sizes between 250 and 500 μm. The powder may be placed in an aluminum sample holder with a quartz window. The electronic spectrum of the cobalt coordination polymer can demonstrate how a typical triplet absorption band dedicated to the $^4A_2 \rightarrow {}^4T_1$ (P) transition of a tetrahedral complex may be formed. This can be contrasted with the low absorption of cobalt nitrate that coincides with a hydrated octahedral complex, as such a transition may be symmetry-forbidden.

Figure 4:
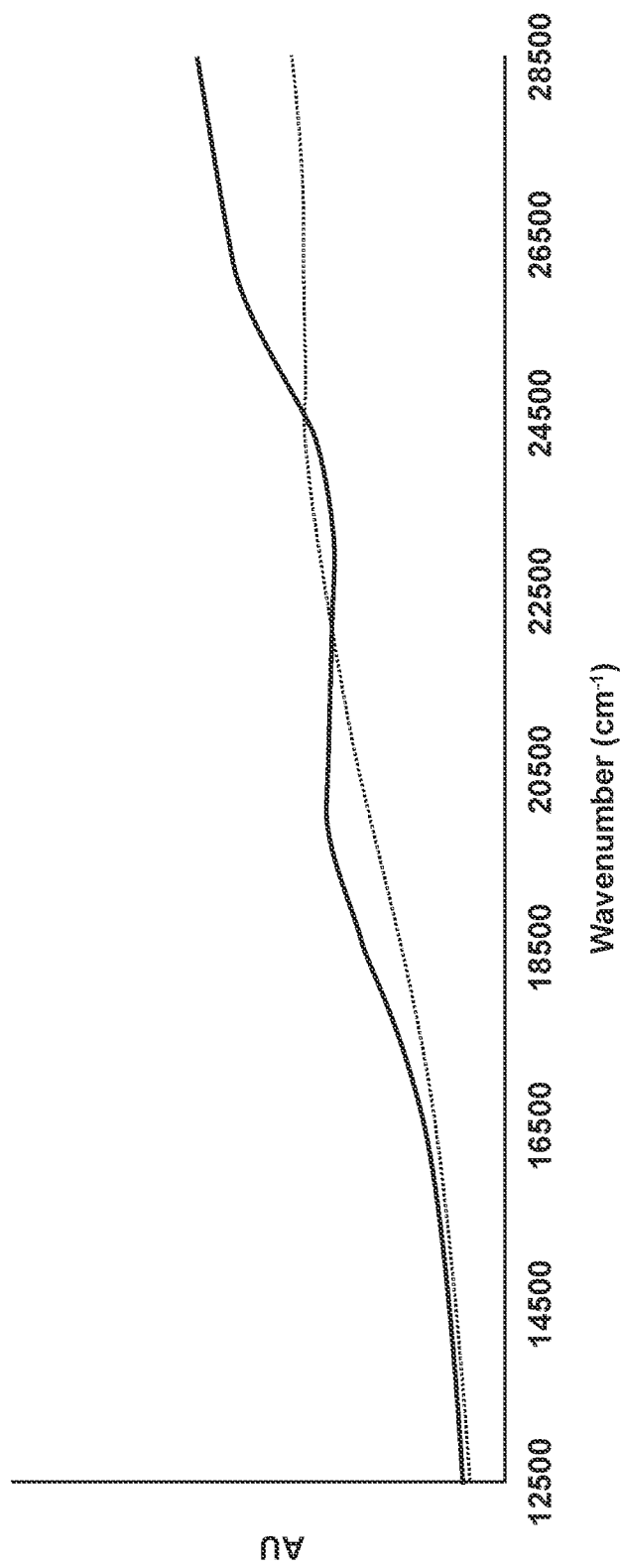
FIG. 4 shows a graph according to aspects of the disclosure that depicts an electronic spectra of a synthesized manganese catalyst and manganese nitrate.

A similar synthesis procedure can also be performed with manganese nitrate as a metal ion source. An electronic spectrum of such a complex is generally illustrated in FIG. 4—which depicts an electronic spectra of a synthesized manganese catalyst (solid line) and manganese nitrate (dotted line). The ground state of manganese in a high-spin $d^5$-orbital occupation can cause all transitions to be spin-forbidden, which may cause a variety of overlapping absorption bands of low intensity, covering the entire visible spectrum for both manganese nitrate and the synthesized complex. However, in the latter, a clear rise in absorption may occur at wavenumbers between 17000 and 22000 cm$^{-1}$. The absorption in this area may be identified as a series of transitions with low $D_q$ values to the $^4$G ground state assigned to a tetrahedral manganese (II) ion.

Figure 5:
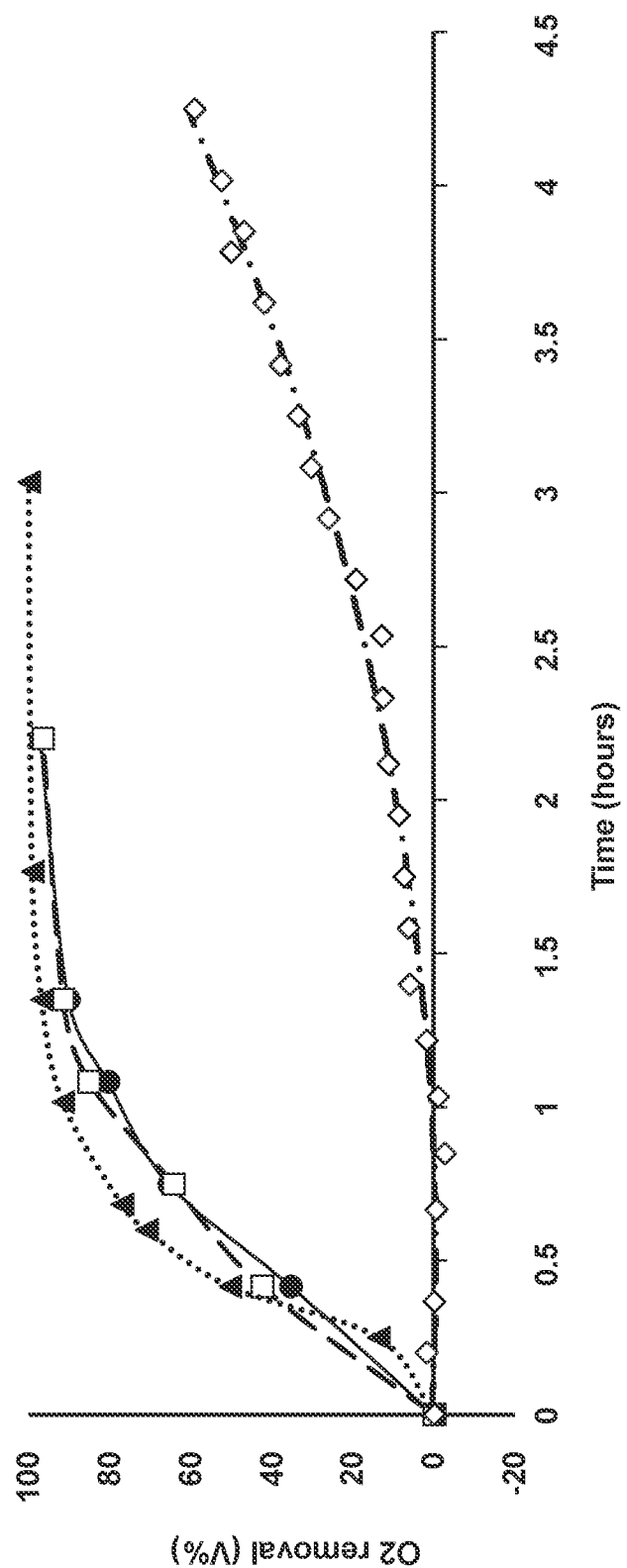
FIG. 5 shows a graph according to aspects of the disclosure that depicts oxygen removal in a closed 10 ml vial with β-pinene as a sacrificial agent with 200 ppm catalyst, being synthesized cobalt catalyst, synthesized manganese catalyst, cobalt stearate, and manganese nitrate.

With embodiments, the activity of metal complexes as Fenton-catalysts can be assessed by a simple test. For example and without limitation, a solution or dispersion of the complex at a concentration of 8.4 mM in relation to the examined metal-ion in 2.5 g β-pinene may be contained in a 10 ml vial. The vial may be sealed with an airtight cap after placing an oxygen sensor in the headspace. The organic solvent reacts with the oxygen trapped in the headspace at a rate that is dependent on the catalytic properties of the metal ions added. The removal of oxygen from the headspace for the synthesized catalysts may be generally visualized as shown in FIG. 5—which generally depicts oxygen removal in a closed 10 ml vial with β-pinene as a sacrificial agent with 200 ppm catalyst, being synthesized cobalt catalyst (●), synthesized manganese catalyst (▲), cobalt stearate (□), and manganese nitrate (◇). Among other things, it was discovered that the manganese coordination polymer can provide a significant improvement in catalytic activity to the nitrate salt and can even surpass the activity of cobalt. The physical separation of metal ions and the generation of the tetrahedral species can both contribute to the significant increase.

With embodiments, alternative ligand structures may be utilized. In embodiments, the basic synthesis can be adjusted by altering the monoacids, diacids, and metal salt. Oxygen scavenging potential can, for example, be examined by the previously referenced test method of oxidizing β-pinene in a closed vial. Sample results are provided in Table 1, below. The activity of the catalyst is represented by the oxygen half-life, which represents the time that it takes for the oxygen in the vial to reach 100 mbar (50% removal). For cobalt, the inclusion in a coordination polymer structure is not particularly beneficial as cobalt stearate itself is mostly in a tetrahedral coordination already. However, in accordance with embodiments of the present disclosure, most synthesized manganese complexes are significantly more efficient in comparison to the standard manganese salts. It is appreciated that the tetrahedral structure may not be present in all synthesized manganese complexes with increased catalytic activity, as such the scope of the present disclosure is not limited to tetrahedral complexes.

TABLE 1

Catalyst samples that were synthesized and analyzed in a vial test with pinene as a sacrificial solvent.

| Metal precursor | Diacid | Monoacid | $t_{0.5}$ O$_2$ (Minutes) |
|---|---|---|---|
| Cobalt | | | |
| Cobalt Stearate (reference) | | | 36 |
| Nitrate | Terephthalic | Stearic | 32 |
| Nitrate | Terephthalic | / | >200 |
| Nitrate | Terephthalic | Palmitic | 39 |
| Nitrate | Terephthalic | Myristic | 36 |
| Nitrate | Terephthalic | Lauric | 27 |
| Nitrate | Terephthalic | Octanoic | 77 |
| Nitrate | Terephthalic | Hexanoic | 108 |
| Nitrate | Terephthalic | Valeric | 83 |
| Nitrate | Terephthalic | Benzoic | 57 |
| Manganese | | | |
| Mn Nitrate (reference) | | | 115 |
| Mn Acetate (reference) | | | 105 |
| Nitrate | Terephthalic | Stearic | 25 |
| Nitrate | Terephthalic | / | >200 |
| Nitrate | Tartaric | Stearic | 51 |
| Nitrate | Citric | Stearic | 86 |
| Nitrate | Malic | Stearic | 35 |
| Nitrate | Adipic | Stearic | 85 |
| Acetate | Terephthalic | Stearic | 30 |

Cobalt and manganese complexes based on the combination of diacid and monoacid ligands may be used in applications involving bottles or containers. In an embodiment, a cobalt complex from this kind was introduced into PET at a metal-based concentration of 50 ppm cobalt. 1.85 wt % MXD6 was added as a sacrificial agent.

Figure 6:
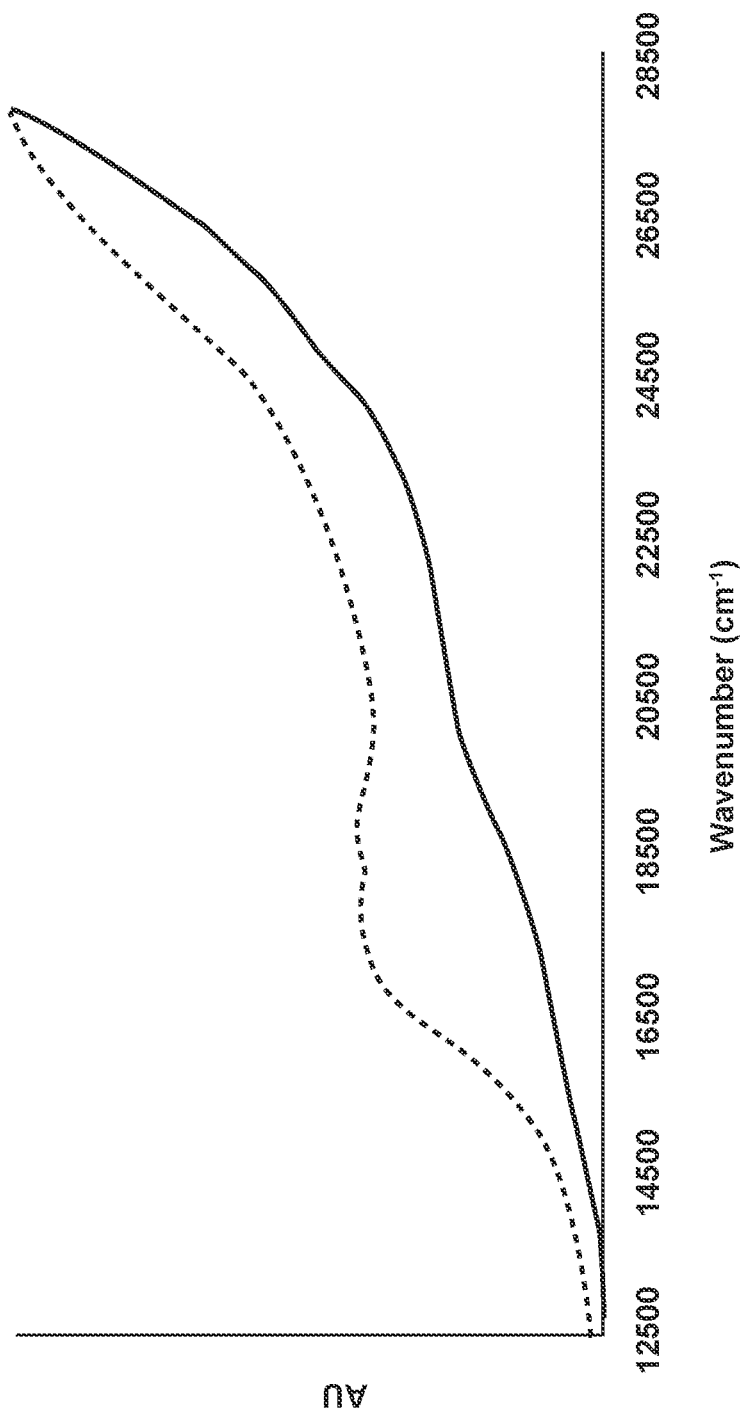
FIG. 6 shows a graph according to aspects of the disclosure that depicts an electronic spectra of manganese and cobalt complexes as introduced in polyethylene terephthalate (PET).

The electronic spectrum of the added complex demonstrates the tetrahedral nature of the cobalt complexes with the presence of the $^4$A$_2$→$^4$T$_1$ (P) transition, such as shown in FIG. 6—which depicts an electronic spectra of manganese (solid line) and cobalt (dashed line) complexes as introduced into polyethylene terephthalate (PET).

Figure 7:
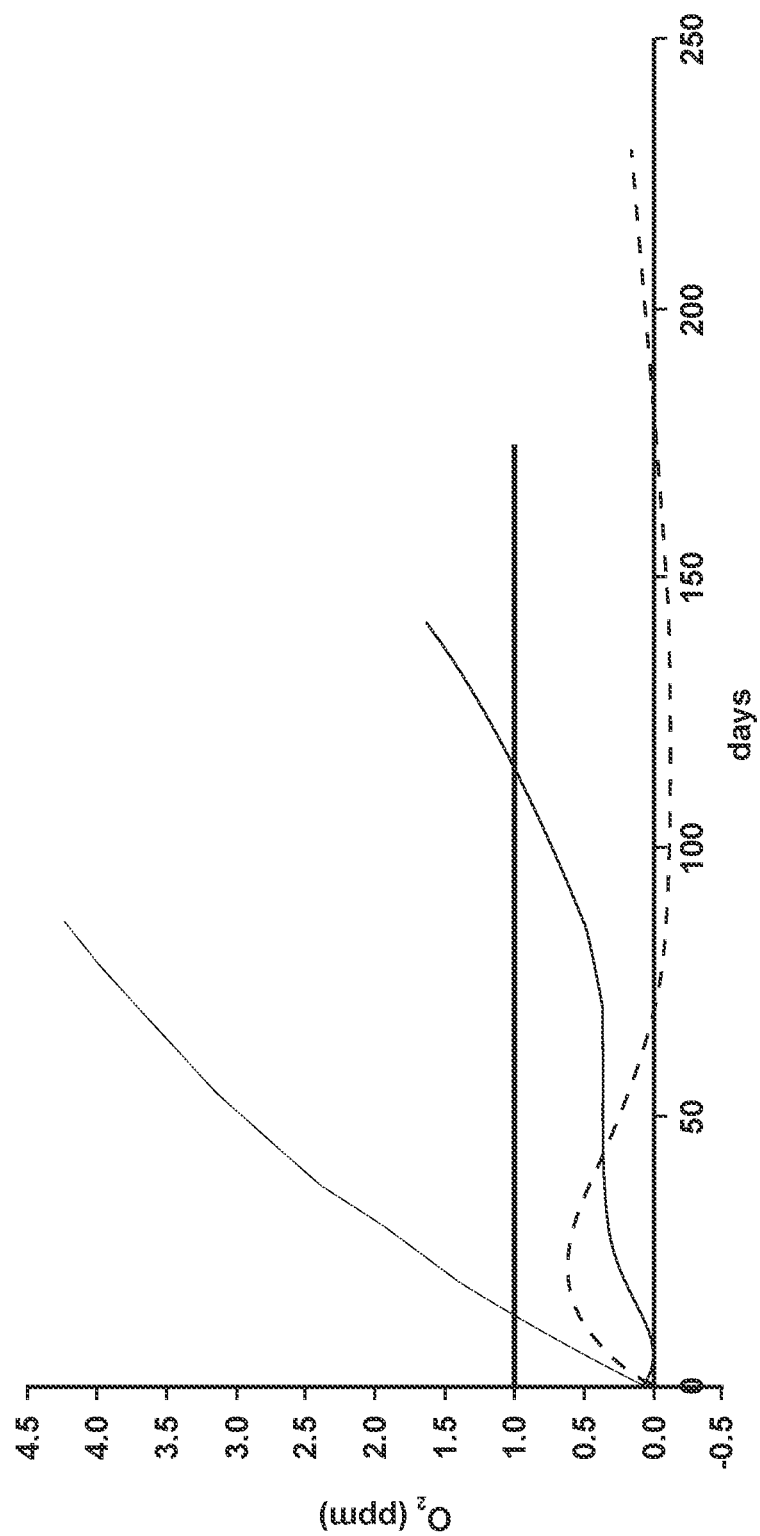
FIG. 7 shows a graph according to aspects of the disclosure that depicts oxygen concentration in a bottle with 2% MXD6 and a standard Mn salt, 2 wt % MXD6 with Mn in a complex with both monoacidic and diacidic ligands, 1.85 wt % MXD6 with Co in a complex with both monoacidic and diacidic ligands.

In embodiments the foregoing composition was injected to form preforms and blown into a 330 ml bottle. Oxygen concentration in this bottle was measured over time by inserting an oxygen sensor inside the bottle prior to filling it with deoxygenated water and sealing it off with an aluminum seal. The results are generally shown in FIG. 7—which shows an oxygen concentration in a bottle with 2% MXD6 and a standard Mn salt (light solid line), 2 wt % MXD6 with Mn in a complex with both monoacidic and diacidic ligands (dark solid line), and 1.85 wt % MXD6 with Co in a complex with both monoacidic and diacidic ligands (dashed line).

In an embodiment, a manganese complex from the same kind was introduced into PET at a metal-based concentration of 250 ppm Mn and 2 wt % MXD6 was added as a sacrificial agent. The electronic spectrum of the added complex demonstrated the tetrahedral nature of the manganese complexes with the presence of the transitions around 20000 cm$^{-1}$, such as generally illustrated in FIG. 6. This composition was injected to form preforms and blown into a 330 ml bottle. Oxygen concentration in this bottle was measured over time by inserting an oxygen sensor inside the bottle prior to filling with deoxygenated water and sealing it off with an aluminum seal. The results are generally illustrated in FIG. 7.

With embodiments of the disclosure different manganese coordination polymers may be used as a suitable oxygen scavenger or scavenging material. For example and without limitation, in an embodiment, a highly-active Mn-based oxygen barrier was provided with 2% MXD6. Additionally, there can be a difference in activity between Mn neodecanoate and Mn coordination polymer on a low concentration with 1.85% MXD6. Certain custom or tailor-made manganese based catalysts may be prepared and used in place of cobalt with oxygen scavengers, and may particularly be used in connection with plastic (e.g., PET) injection molding.

A further aspect of the present disclosure involves, among other things, radical initiators that may be used in connection with oxygen barriers associated with plastic preforms and/or containers.

Oxygen as a diradicalar molecule typically only reacts with organic compounds through single-electron oxidations. In order for oxygen to be taken up by a sacrificial polymer in an oxygen scavenger system, there commonly first needs to be organic radicals present. Such radicals are usually produced at PET processing temperatures, but may, for example and without limitation, also be generated by photo-initiation, electrobeam, or microwave irradiation. Such types of treatment may be beneficial for a delayed initial phase, for instance, to control the start of a scavenging reaction.

In other embodiments, certain additives may be used to increase the initiation rate by indirect radical generation, such as at the PET processing step. As such, organic compounds with decomposition temperatures below PET processing temperatures may degrade in a radicalar mechanism at much higher rates than the main sacrificial compound. The oxygen scavenging capacity this carries, can cause a short but intense oxygen scavenging rate increase in the packaging as the container is filled. This can encompass mainly unsaturated compounds, such as squalene, unsaturated fatty acids, and polybutadiene.

However, with embodiments of the present disclosure certain thermal radical initiators can be used to not only cause a faster initiation, but may also increase shelf life of a container and its contents by a significant amount, even without any oxygen scavenging capacity on its own or external triggers. With embodiments, such a reaction may only be active during the molding (e.g., injection molding) phase. However, the increased initiation can provide for a higher propagation rate, such that the effect of radical termination may be reduced by limiting the effect of antioxidative additives and yet provide a higher reactive oxygen species content.

The radical initiators may comprise azo-compounds or peroxides. The following, without limitation, are some examples: tert-Amyl peroxybenzoate, 4,4-Azobis(4-cyanovaleric acid), 1,1'-Azobis(cyclohexanecarbonitrile), 2,2'-Azobisisobutyronitrile, Benzoyl peroxide, 2,2-Bis(tert-butylperoxy)butane, 1,1-Bis(tert-butylperoxy)cyclohexane, 2,5-Bis(tert-butylperoxy)-2,5-dimethylhexane, 2,5-Bis(tert-Butylperoxy)-2,5-dimethyl-3-hexyne, Bis(1-(tert-butylperoxy)-1-methylethyl)benzene, 1,1-Bis(tert-butylperoxy)-3,3,5-trimethylcyclohexane, tert-Butyl hydroperoxide, tert-Butyl peracetate, tert-Butyl peroxide, tert-Butyl peroxybenzoate, tert-Butylperoxy isopropyl carbonate, Cumene hydroperoxide, Cyclohexanone peroxide, Dicumyl peroxide, Lauroyl peroxide, 2,4-Pentanedione peroxide, Peracetic acid, Potassium persulfate.

Such radical initiators may, for example and without limitation, be added to an oxygen barrier that may comprise or consist of a transition metal catalyst (e.g., Co, Mn, Fe, or Cu) and an organic compound (e.g., MXD6, MXBI, Polybutadiene, Polysqualene, or polytetrahydrofuran).

In an embodiment, a radical initiator of the type taught by this disclosure may be used in combination with a transition metal catalyst (such as manganese, which is compatible with PET), and further may include an organic compound, such as MXD6.

Figure 8:
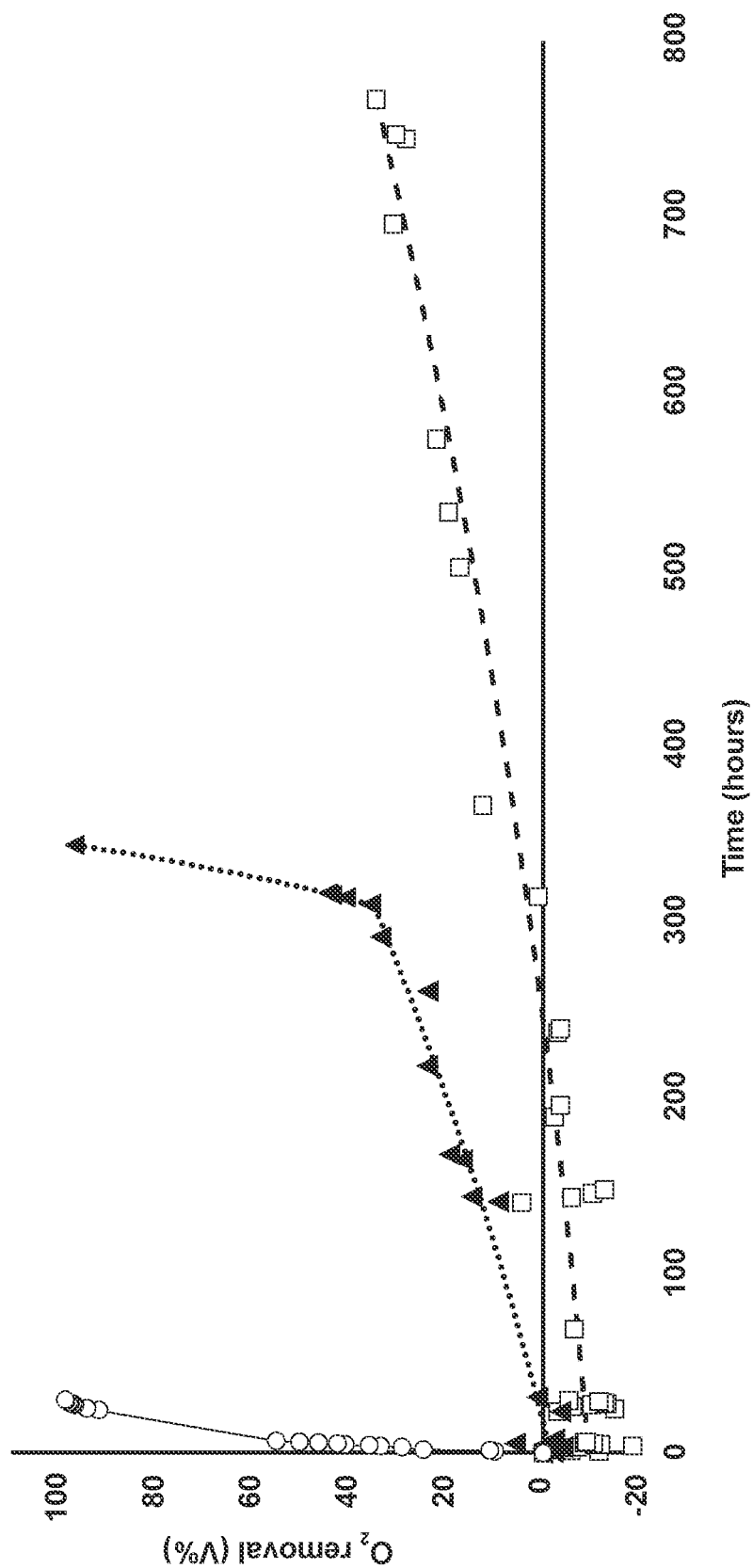
FIG. 8 shows a graph according to aspects of the disclosure that depicts oxygen removal in a closed 20 ml vial with styrene as a sacrificial agent with 200 ppm cobalt, without further additives, with 0.2 wt % TTBP, and with 0.2 wt % TTBP and 0.4 wt % AIBN.

The following examples are for illustration purposes only and are not intended to limit the scope of the disclosure or claims. In an embodiment, a solution of 0.2 wt % of cobalt stearate in 2.5 g styrene was produced to model the effect of certain additives to an oxygen scavenger composition. The effect of a common antioxidant in polymer processing, 2,4,6-tri-tert-butyl phenol (TTBP) was examined by adding it at 0.2 wt % to the solution. It was contained in a 20 ml vial and capped with an oxygen sensor provided in the headspace. The oxygen concentration in the vial at room temperature was monitored in time and the conversion of oxygen is generally illustrated in FIG. 8—which shows a graph of oxygen removal in a closed 20 ml vial with styrene as a sacrificial agent with 200 ppm cobalt, without further additives ( ----○---- ), with 0.2 wt % TTBP ( - - -□- - - ), and with 0.2 wt % TTBP and 0.4 wt % AIBN ( ···△··· ).

While the blank reference fully removed all oxygen from the vial within 2 days, the oxygen scavenging reaction with high levels of antioxidant additive barely scavenged any oxygen. The addition of a radical initiator, however, partially negated this effect. That is, 0.4 wt % of azobisisobutyronitrile (AIBN) was added to a solution that also included the antioxidant. The scavenging reaction clearly showed a slower initiation, but eventually, the inhibitive effect wore off and the oxygen level was quickly depleted. As such, the disclosure demonstrates that the scavenging rate of these materials can be enhanced even at highly stabilized conditions.

Figure 9:
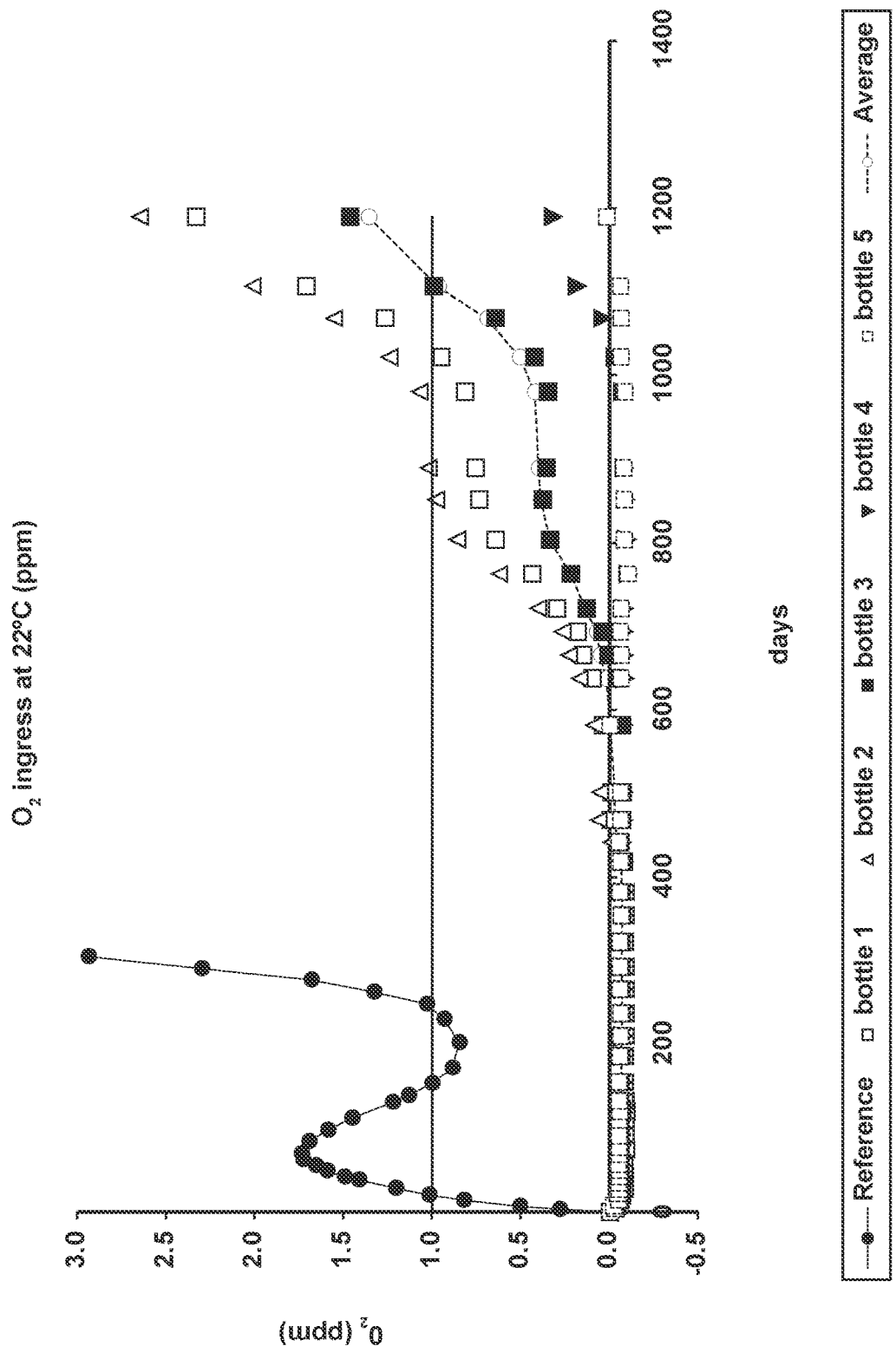
FIG. 9 shows a graph according to aspects of the disclosure that depicts data from bottle tests with peroxides.

FIG. 9 shows a graph according to aspects of the disclosure that depicts data from bottle tests with peroxides. More specifically, FIG. 9 displays the oxygen concentration in 330 ml bottles containing 1.85% of MXD6, 325 ppm Co(II) stearate in a Lotte Papet Max resin composition. In the embodiments, 0.42 wt % 2,5-Bis(tert-butylperoxy)-2,5-dimethylhexane was added in all samples except for the reference sample. The reference sample still contains the same MXD6 and Cobalt content. This compound was added to the blend directly before injection.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such elements. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While examples of dimensions of certain components may be described herein, such dimensions are provided as non-limiting examples and the components may have other dimensions.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A barrier for plastic injection molding, the barrier comprising:
    a manganese catalyst; and
    an oxygen barrier;
    wherein a polynuclear complex is created via manganese ions that are separated by organic bifunctional ligands comprising terephthalic acid.

2. The barrier of claim 1, wherein the oxygen barrier comprises MXD6.

3. The barrier of claim 1, wherein the organic bifunctional ligands comprise polyacids.

4. The barrier of claim 1, wherein the oxygen barrier comprises an oxygen scavenger.

5. The barrier of claim 4, wherein the oxygen barrier is devoid of cobalt.

6. The barrier of claim 1, wherein the manganese ions are physically separated.

7. The barrier of claim 6, wherein the physical separation between the manganese ions serves as a barrier between them.

8. The barrier of claim 1, wherein the manganese ions are separated by organic bifunctional ligands comprise polyamines.

9. The barrier of claim 8, wherein the terephthalic acid of the organic bifunctional ligands is rigid.

10. The barrier of claim 1, including a ligand with a single location site.

11. The barrier of claim 10, wherein the ligand comprises a monoacid, monoamine, or diamines.

12. The barrier of claim 10, wherein the ligand disrupts a crystalline structure, forming a coordination polymer.

13. The barrier of claim 12, wherein the coordination polymer is an Mn-based coordination polymer.

14. A composition comprising a polymer and a barrier as disclosed in claim 1, the barrier introduced into the polymer.

15. The composition of claim 14, wherein the polymer is PET.

16. The composition of claim 14, wherein the polymer comprises polypropylene (PP).

17. The composition of claim 14, wherein the polymer comprises polyethylene (PE).

18. The composition of claim 14, wherein the polymer is PET, and the composition comprises a metal-based concentration of 250 ppm Mn.

19. The composition of claim 18, wherein the oxygen barrier comprises about 2 wt % MXD6.

20. An article that is injection molded from a composition comprising a polymer and a barrier according to claim 1.

21. The article of claim 20, wherein the article comprises a preform or container.

* * * * *